May 12, 1959 H. ROCKWELL 2,886,398
AUTOMATIC SIGNAL LOCATING FOR MAGNETIC DRUM RECORDER
Filed Nov. 2, 1953
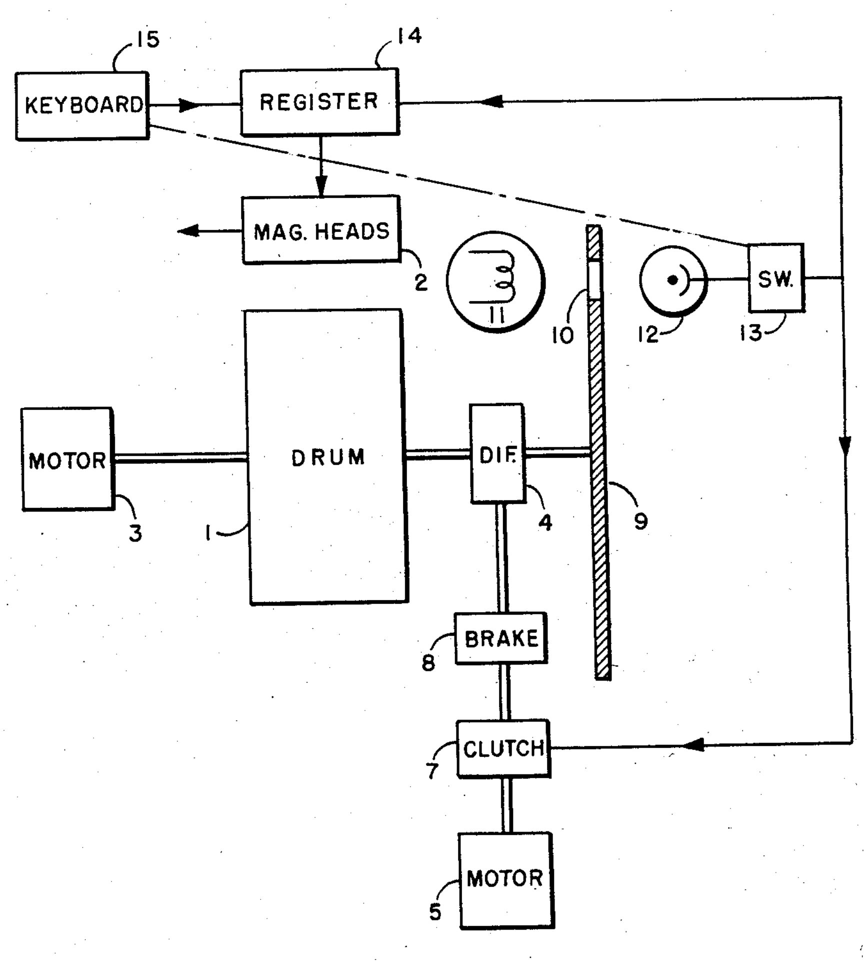
Inventor
Henry Rockwell
By W. R. Maltby
D. C. Snyder
Attorneys United States Patent Office 2,886,398

Patented May 12, 1959

2,886,398

AUTOMATIC SIGNAL LOCATING FOR MAGNETIC DRUM RECORDER

Henry Rockwell, New York, N.Y., assignor, by mesne assignments, to the United States of America as represented by the Secretary of the Navy Application November 2, 1953, Serial No. 389,907

5 Claims. (Cl. 346—74)

The present invention relates generally to data storage systems and more particularly to apparatus for and methods of magnetically recording digital information received at irregular time intervals.

In the preparation of programs for electronic computers, the problem often arises of providing interim storage for input control characters received at irregular time intervals from manually operated keyboard equipment and of transferring this information at a subsequent time, with a minimum of delay and manual handling, to a final storage unit in the computer. Heretofore, the general practice has been to employ a perforated paper tape as the temporary storage element between the keyboard and the computer. Besides requiring an excessive amount of tape for storing a given number of signal characters, this method requires that the perforated tape be shifted to a playback device before the information recorded therein can be transferred to the storage unit of the computer. This last step, which consumes as much time as the original perforating operation, is necessary because satisfactory playback cannot be obtained with the magnetic tape in the storage unit of the computer moving at the low speed of the tape perforating equipment.

It is also impracticable to feed the characters as initially received from the keyboard directly into the final magnetic storage tape as the latter would have to be advanced in sharp jerks of one pulse space after each key selection. Since such an advancement is usually in the order of .01 inch, complex auxiliary equipment must be employed with this technique.

It is accordingly a primary object of the present invention to provide signal storage apparatus for recording small amounts of information received at irregular time intervals and for subsequently transferring this information to an electronic computer.

A secondary object of the present invention is to provide a magnetic memory circuit for storing in proper sequence signals occurring at irregular time intervals and for playing back the information so stored at a rate compatible with the operating characteristics of electronic computers.

A still further object of the present invention is to provide an efficient and simple arrangement for storing program signals for digital computers.

A still further object of the present invention is to provide an indexing arrangement for insuring the proper recording of control signals on a continuously rotating magnetic drum member.

A still further object of the present invention is to provide a system for recording irregularly received signals at constant pulse spacing on a magnetic storage member.

Other objects and many of the attendant advantages of this invention will be readily appreciated as the same becomes better understood by reference to the following detailed description when considered in connection with the accompanying drawing, the single figure of which is a block diagram of a preferred embodiment of the invention.

Briefly, and in general terms, the present invention utilizes as the intermediate storage member a small drum coated with a suitable magnetic recording medium and fitted with conventional recording, playback and erase heads placed close to its periphery. This drum revolves at a constant speed high enough for adequate playback signal voltage. Since the information from the manually operated keyboard arrives at irregular intervals, it is necessary to provide a method of synchronization to insure that every row of pulses is recorded onto the drum in correct sequence and at constant pulse spacing. It is obvious that the first row can be applied at a given position on the drum by triggering the recording circuits from some fixed mark on the drum periphery. After this line has been recorded, however, the drum may be rotated for quite a number of revolutions before the next set of information is available. The task is therefore to record the second row of information one pulse space away from the first one, and so on, regardless of the time that has elapsed since the recording of the first row. The present invention solves this problem by means of an indexing disk which runs at the same speed as the magnetic drum and has an aperture in its face which permits a light beam directed at a photocell to produce periodically trigger pulses for activating the recording circuits. After each recording operation, this disk is rotated relative to the drum by an amount equal to a single signal storage space. As a result, successive trigger pulses are properly timed to record consecutive pulse groups in evenly spaced rows. By means of this technique, each row of pulses is recorded onto the drum in correct sequence and at a constant pulse spacing.

Referring now to the drawing, a drum member 1 coated with a suitable magnetic recording medium and fitted with conventional recording, playback and erase heads, generally represented by reference character 2, is continuously rotated at a constant speed by motor 3. A differential gear arrangement, element 4, suitable for compounding two rotary motions has one of its inputs supplied by this motor and the other by auxiliary motor 5 whose output shaft has mounted thereon a single revolution clutch mechanism 7 and brake member 8. If desired, the auxiliary motor may be dispensed with and both input drives obtained from motor 3 through well known gearing techniques. Brake 8 prevents motor 3 from driving auxiliary motor 5 and its associated components. The gear train of auxiliary motor 5 and the characteristics of differential 4 are such that one operation of clutch member 7 displaces an indexing disk 9, secured to the output of this differential, relative to drum 1 by an amount equal to the space necessary to record on the latter a single row of signal pulses. Disk 9, which rotates at the same speed as drum 1 except for the intermittent action of clutch 7, has an aperture 10 in its face which periodically permits an alternating light beam from source 11 to reach photoelectric tube 12. Photoelectric tube 12 is therefore activated once for each rotation of disk member 9, producing, as a consequence, a single trigger pulse. This pulse controls the energization of clutch mechanism 7 by means of a suitable electromagnetic device and also the institution of the recording operation.

Inserted between the keyboard of transmitter 15 and the recording heads 2 is a signal register 14, whose function is to transfer signals present in its input circuit due to the operation of keyboard 15 to its output circuit only when its control circuit is activated by a trigger pulse. In one form, this signal register may consist of a plurality of multigrid electron tubes having their control grids coupled to keyboard 15, their screen grids coupled to the output circuit of photoelectric tube 12, and their output circuits feeding recording heads 2.

Normally, the photoelectric circuit is ineffective and clutch mechanism 7 de-energized. However, as soon as any key of keyboard 15 is depressed, the latter circuit is rendered effective and the system thereby conditioned for operation. A simple switching mechanism 13 controlled from a universally operated key of transmitter 15 and, connected either in the power supply of this tube or in the latter's output circuit, can readily give this result. It is to be understood that input signals are maintained at the register for a time sufficient to insure transfer of the information to the magnetic heads. Whenever information is awaiting storage, therefore, photoelectric tube 12 triggers the recording to take place within a time delay which does not exceed the time required for one revolution of drum 1. The trigger pulse available at this time also energizes clutch 7 and permits motor 5, through the instrumentality of differential gear 4, to displace the indexing disk one pulse space with respect to drum 1. This action completes the recording cycle for this particular keyboard signal and thereafter the system remains dormant until the next key is depressed. As a precaution, keyboard member 15 can be arranged to remain locked until clutch 7 has completed its revolution, the mechanism needed for this being readily available in conventional telegraph transmitting equipment.

After a given number of rows have been recorded in this manner and clutch 7 has made sufficient revolutions to bring the magnetic drum and the synchronized disk back into phase, i.e., the aperture 10 coinciding with the first row of signals recorded, photocell 12 may be used as a trigger to discharge all the information so recorded into the magnetic tape storage unit of the computer in one rotation of the drum. This playback can be done automatically by suitable devices such as, for example, a counter operating from the clutch magnet of element 7. During this playback, arrangements can be made to start the motion of the above magnetic tape so that the drum can record directly into it at speeds compatible with the operation of the digital computer. After recording, the drum can be cleaned by means of the erasing heads and made available for further recording in the same manner as set forth above. The time taken for playback and erasure is of a relatively short duration so that the operator need only lock the manual keyboard for a time equivalent to approximately three revolutions of the drum.

It will be apparent from the foregoing that the present system will preserve its correct relationship even if shut off for any period of time, provided that the drum member 1 is accelerated to full speed before depressing a key member. This can be assured by incorporating suitable interlocking equipment in the system. The above system, it would be pointed out, can be equally well employed to send recorded information to an output printer or any other device at whatever rate such equipment can absorb it.

Obviously many modifications and variations of the present invention are possible in the light of the above teachings. It is therefore to be understood that within the scope of the appended claims the invention may be practiced otherwise than as specifically described.

What is claimed is:

1. Electronic data storage apparatus for recording at regular predetermined spacings groups of input control signals occurring at irregular time intervals, comprising a continuously rotatable drum coated with a magnetic recording medium, a plurality of recording heads disposed adjacent said drum and adapted to apply a row of magnetization spots to the surface thereof in response to each group of signals coupled thereto, an indexing disk driven at the same speed as said drum, means including said disk for generating a single trigger pulse during each cycle of revolution of said drum, means responsive to the occurrence of input signals to apply a trigger pulse to control the coupling of said input signals to said recording heads, thereby recording said input signals at a first location on said drum, and means responsive to said last-named trigger pulse to displace said disk angularly with respect to said drum by a given fixed amount corresponding to said predetermined spacing whereby the next trigger pulse is generated at a different point in the cycle of revolution of said drum and whereby the coupling of input signals to said recording heads occurs when a second location adjacent to said first location is exposed to said recording heads.

2. In a data storage system, a source of irregularly occurring coded pulse groups, a rotating drum having its peripheral surface adapted to be magnetized, a plurality of recording heads positioned adjacent said surface so as to magnetize finite aligned portions of said surface when coded pulse groups are coupled thereto, a light source and a photocell circuit, an apertured disk rotating therebetween in synchronism with said drum, said aperture permitting the light beam from said source to impinge upon said photocell once during each cycle of revolution of said drum thereby to generate a control pulse, means operated by said control pulses for completing a signal transmission path between said source and said recording heads whereby said coded pulse groups are recorded on said drum surface, and means also operated by said control pulse for rotating said apertured disk relative to said drum by a constant amount, whereby successive control pulses are generated at different points in the cycle of revolution of said drum corresponding to times when adjacent sections of said drum surface are exposed to said recording heads.

3. In a data storage system, the combination of a signal generator intermittently operated so as to produce pulse groups in its output circuit at irregular time intervals, a rotating drum having its peripheral surface coated with a magnetic recording medium, a row of recording heads positioned next to said surface so as to magnetize finite aligned portions of said surface when pulse groups are coupled thereto, a light source and a photocell, an apertured disk rotating therebetween in synchronism with said drum, said aperture being adapted to provide a light transmission passage between said light source and said photocell once during each cycle of revolution of said drum, means responsive to each operation of said signal generator for controlling said photocell whereby a trigger pulse is produced in its output circuit when said aperture next provides a light transmission passage between said source and said photocell, means operated by said trigger pulses for coupling said signal generator to said recording heads whereby any pulse groups present in the output circuit of said signal generator are recorded on said surface, and means also operated by said trigger pulses for angularly offsetting said apertured disk with respect to said drum by a fixed amount whereby successive trigger pulses are generated at different points in the corresponding cycles of revolution of said drum such that the irregularly occurring pulse groups are recorded in equally spaced, adjacent rows on said surface.

4. In a data storage system, the combination of an intermittently operated signal generator producing coded pulse groups at irregular time intervals, a rotating drum having its peripheral surface coated with a magnetic recording medium, a temporary storing device for retaining the coded pulse groups produced by said generator for a time interval corresponding to at least the time required for one cycle of revolution of said drum, a row of recording heads positioned adjacent said surface so as to magnetize finite aligned portions of said surface whenever pulse groups are coupled thereto, a light source and a photocell, an apertured disk rotating therebetween in synchronism with said drum, said aperture being adapted to allow the light from said source to impinge upon said photocell once during each cycle of revolution of said drum, means responsive to the operation of said signal generator for controlling said photocell whereby a trigger pulse is generated in its output circuit when said aperture next allows the light from said source to impinge upon said photocell, means operated by each trigger pulse so generated for transferring the coded pulse groups from said temporary storage device to said recording heads whereby said pulse groups are recorded on said drum surface, and means also operated by each trigger pulse for angularly offsetting said apertured disk with respect to said drum by a constant amount equivalent to the space desired between adjacent recorded rows of pulses whereby successive trigger pulses are generated in the photocell output circuit at different points in the corresponding cycles of revolution of said drum surface.

5. In a data storage system the combination of a continuously rotatable drum member having its peripheral surface magnetizable, means for generating input signal groups at irregular time intervals, a plurality of recording heads disposed adjacent said surface and adapted to magnetize finite portions thereof in accordance with the input signal groups coupled thereto, a photoelectric pulse generator, said generator having as a component thereof an apertured disk which rotates in synchronism with said drum member and which controls the time at which said photoelectric pulse generator produces an output pulse, means for activating said photoelectric generator whenever an input signal group is generated, means responsive to each output pulse generated by said photoelectric generator for controlling the time at which the corresponding input signal group is coupled to said recording heads whereby the location on said drum member at which said signal input group is recorded is determined, and means activated by each output pulse for rotating said disk relative to said drum by a fixed amount whereby the time of occurrence of the following output pulse is delayed when the next input signal group is generated.

References Cited in the file of this patent

UNITED STATES PATENTS

| | | |
|---|---|---|
| 1,766,644 | Jenkins | June 24, 1930 |
| 2,427,421 | Rieber | Sept. 16, 1947 |
| 2,614,169 | Cohen et al. | Oct. 14, 1952 |
| 2,617,705 | Combs et al. | Nov. 11, 1952 |
| 2,714,843 | Hooven | Aug. 9, 1955 |